US006945101B2

(12) United States Patent
Wilson

(10) Patent No.: US 6,945,101 B2
(45) Date of Patent: Sep. 20, 2005

(54) DEVICE FOR DETECTING OVERHEATED TIRES

(75) Inventor: Paul B. Wilson, Tallmadge, OH (US)

(73) Assignee: Bridgestone/Firestone North American Tire, LLC, Nashville, TN (US)

(*) Notice: Subject to any disclaimer, the term of this patent is extended or adjusted under 35 U.S.C. 154(b) by 0 days.

(21) Appl. No.: 10/600,796

(22) Filed: Jun. 20, 2003

(65) Prior Publication Data

US 2004/0004549 A1 Jan. 8, 2004

Related U.S. Application Data

(60) Provisional application No. 60/390,592, filed on Jun. 20, 2002.

(51) Int. Cl.[7] ............................................. G01M 17/02
(52) U.S. Cl. ......................................................... 73/146
(58) Field of Search ................................. 73/146–146.8

(56) References Cited

U.S. PATENT DOCUMENTS

| 5,035,137 | A | * | 7/1991 | Burkard et al. | ............ 73/146.5 |
| 5,071,259 | A | * | 12/1991 | Metzger et al. | ............. 374/143 |
| 5,917,417 | A | | 6/1999 | Girling et al. | |
| 5,962,778 | A | | 10/1999 | Billieres | |
| 6,027,693 | A | | 2/2000 | Molina et al. | |
| 6,748,797 | B2 | * | 6/2004 | Breed et al. | .................. 73/146 |

FOREIGN PATENT DOCUMENTS

DE          100 40 647 A1     2/2002

OTHER PUBLICATIONS www.ciwmb.ca.gov—LEA Advisory #46—Evaluation of Employee Health Risk From Open Tire Burning—8 pages— dated Nov. 6, 1997.
Planned U.S. Senor Network Targets Terror Threats, Rick Merritt, PlanetAnalog.com, dated Jul. 14, 2003, consisting of 5 pages.
Boeing Brings Space Technology Down to Earth to Make Hydrogen Fuel Safer, lexis–nexis.com, dated May 24, 2001, consisting of 2 pages.
New Sensors Emit Light When Chemicals Are Near, thomasregional.com, dated Feb. 14, 2002, consisting of 2 pages.
Gas and Vapor Detectors for Industrial Health and Safety, ENMET Corporation, cnmet.com, dated 1997, consisting of 12 pages.

* cited by examiner

Primary Examiner—William Oen
Assistant Examiner—Jermaine Jenkins
(74) Attorney, Agent, or Firm—Fred H. Zollinger, III

(57) ABSTRACT

A tire monitoring device includes a sensor adapted to detect airborne molecules generated when tire components are overheated. The sensor may be positioned in a reader that is proximate the exterior of the tire. The sensor may also be exposed to the air inside the pressurized tire chamber. The sensor may be tuned to detect any of a variety of molecules or components that are generated when tire materials are overheated.

19 Claims, 2 Drawing Sheets

DEVICE FOR DETECTING OVERHEATED TIRES

CROSS REFERENCE TO RELATED APPLICATION

This application claims priority from U.S. provisional patent application Ser. No. 60/390,592 filed Jun. 20, 2002; the disclosures of which are incorporated herein by reference.

BACKGROUND OF THE INVENTION

1. Technical Field

The present invention generally relates to monitoring devices and, more particularly, to a tire monitoring device adapted to create an indication signal in response to an overheated tire condition. Specifically, the invention relates to a tire monitoring device having a sensor that is adapted to identify airborne molecules that are created when tire rubber becomes overheated.

2. Background Information

Various different tire monitoring devices are known in the art. The various monitoring devices are configured to sense different tire conditions such as tire pressure, temperature, revolutions, and footprint shape. One type of monitoring device is attached to the tire valve and is disposed outside the wheel. Another type of monitoring device is carried inside the wheel and may be attached to the tire or the rim. Another type of known tire monitoring device is loosely disposed within the wheel. A drawback to these devices is that it is difficult to configure them to create an early warning signal in response to the beginning of an overheated tire condition.

In some situations, a tire that is beginning to fail includes components that are frictionally moving with respect to each other. The friction generates heat that will raise the internal temperature of the tire. Overheated tire components break down and weaken the tire. Although monitoring devices configured to sense temperature will create a warning signal when the overheated tire condition has warmed the tire or the tire chamber to a certain level, they generally do not create a signal at the beginning of an overheated tire condition. Known tire monitoring devices will not create the warning signal at the beginning of an overheated tire condition when the temperature sensor of the monitoring device is not positioned close to the components that are creating the friction. With some prior art tire monitoring devices, the monitor will not generate an alarm signal until the overheated condition has warmed the area of the tire adjacent the temperature sensor or the internal chamber of the tire. Such warming takes time which allows the condition causing the overheating to worsen before it is detected. The art thus desires a monitoring device that is configured to sense the beginning of the overheated tire condition.

A current trend in the mining industry is a move towards unmanned trucks. With the precise level of control available through the current GPS systems and remote monitoring, it is possible to send equipment on hauls without the need for a human operator. Under this arrangement, the vehicle monitors various operating parameters of the on-board systems and periodically communicates the condition of on-board systems via radio to a central dispatch location. The monitored systems can include various temperatures, fluid levels, and pressures. Whenever any of these monitored parameters reach an out-of-limit level, corrective action can be taken immediately, for instance, directing the vehicle to an appropriate maintenance facility.

The performance of the tires must be closely monitored because the movement of the vehicle is dependent upon the tires. Typical mining applications involve operating the vehicles at the limits of designed load and operational capacity. Such conditions place the tires under continual stress. Tires not adequately inflated to the pressures required for these conditions may overheat and ultimately suffer a heat-related injury and early removal from service.

Tires that overheat generally begin to suffer damage as the polymer breaks down and loses structural integrity. As the polymer degrades, micro-fractures in the polymer chain begin to grow, resulting in larger cracks. These cracks then create friction that produces more heat and more damage. This process will continue and accelerate, resulting ultimately in the loss of structural integrity of the tire if the tire is not removed from service or placed in a less-severe operating environment.

These small pockets of micro fractures generate heat and can reach damaging levels of temperature causing breakdown of the polymer and other chemicals and additives in the rubber compound. Airborne chemicals are released and result in an odor often termed "burning rubber smell." Many times, an overheated tire is identified first by this distinctive odor. Because these pockets of micro fractures are relatively small initially, the heat generated is insufficient to significantly raise the overall tire temperature or temperature of the contained air within the tire chamber. Therefore simple temperature detectors will not identify an overheated tire until the tire damage is relatively extreme.

BRIEF SUMMARY OF THE INVENTION

The invention provides a tire monitoring device that is configured to generate a signal at the beginning of an overheated tire condition. The monitoring device is adapted to sense airborne molecules generated from overheated tire rubber.

The invention provides one embodiment of a monitoring device mounted to a reader that is brought into proximity with the subject tires. The reader may be a hand-held reader, a gate-style reader, or an on-board reader. While the tire is proximate the reader, the air immediately adjacent the tires is analyzed to allow molecules generated from overheated tire rubber to be sensed. The monitoring device generates a warning signal when the concentration of the target molecules in the air being sensed exceeds a minimum level. The invention provides another embodiment of the invention wherein a monitoring device is mounted within the tire and rim combination so that the monitoring device monitors the air within the pressurized chamber of the tire.

The invention further provides a method for detecting an overheated tire including the steps of sensing the air adjacent or inside the tire and creating an indication signal when the sensor detects molecules generated by overheated tire rubber.

DETAILED DESCRIPTION OF THE INVENTION

Figure 1:
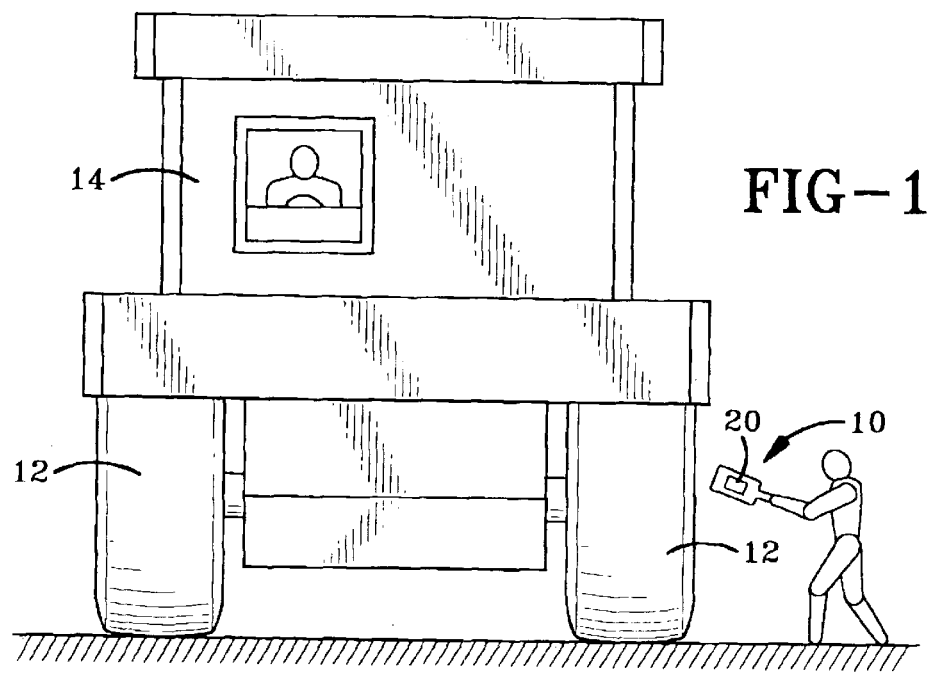
FIG. 1 is a front view of a vehicle with a person holding a hand held reader adjacent one of the tires of the vehicle.

The first embodiment of the monitoring device of the invention is indicated generally by the numeral 10 in FIG. 1. In this embodiment of the invention, monitoring device 10 is in the form of a hand-held reader that may be passed adjacent tires 12 of a vehicle 14 to determine if tire 12 has overheated tire components.

Monitoring device 10 includes a sensor 20 that is tuned to detect the molecules generated by an overheated tire component. Monitoring device 10 may thus include a body having an opening that allows the air surrounding the body to come into contact with sensor 20. In one embodiment, the opening passes entirely through the body so that air will be readily passed across sensor 20. Suitable mechanisms such as fans may be used to draw air or push air across sensor 20. In another embodiment, sensor 20 is disposed on the outside of the body of monitoring device 10.

Sensor 20 is tuned to create an indication signal upon a predetermined criteria. The predetermined criteria may be a predetermined concentration of target molecules disposed adjacent the sensor. The predetermined concentration is set to be high enough to avoid false signals while being low enough to allow tire 12 to be inspected to determine if catastrophic tire damage can be avoided. The exact levels will depend on the type of tire being used with sensor 20 and the environment in which tire 12 is being used. The construction of the tire may also influence the exact settings for sensor 20. The predetermined concentration is also set based on the distance that sensor 20 will be positioned from the tire. In the first embodiment, the user is instructed to bring monitoring device 10 within a given distance of tire 12 to obtain an accurate reading. The distance may be a half meter or within two meters depending on the calibration of sensor 20. In other embodiments, sensor 20 may be calibrated to function within 5 meters. In the embodiments described below, the distance is fixed and sensor 20 may be calibrated to the known distance. In another embodiment of the invention, the predetermined criteria may simply be the presence of a certain molecule that is present in the air during an overheated tire condition.

Sensor 20 may be designed to sense any of a variety of components that are known to be created when a tire is overheated. These components may include various sulfur compounds, monomers of the polymers that are present in the tire rubber, or other compounds that are generated when tire rubber is overheated. Sensor 20 is tuned to sense only molecules generated by hot tire components so that false signals are avoided. Sensor 20 may be any of a variety of sensor types that create a signal when exposed to a gas with selected components from heated rubber. Examples of known sensors that may be used with this invention include those which use LED sensors, catalytic (hot wire), electrochemical, and Metallic Oxide Semiconductor (MOS). Other types of sensors may also be used without departing from the concepts of the present invention.

Sensor 20 will thus create a warning signal long before the overheated tire condition generates enough heat to trigger a temperature sensor. The early warning nature of the invention allows the tire to be saved before catastrophic damage occurs. The indication signal created by sensor 20 may be in the form of a visual light, an audible signal, or a scaled number.

Figure 2:
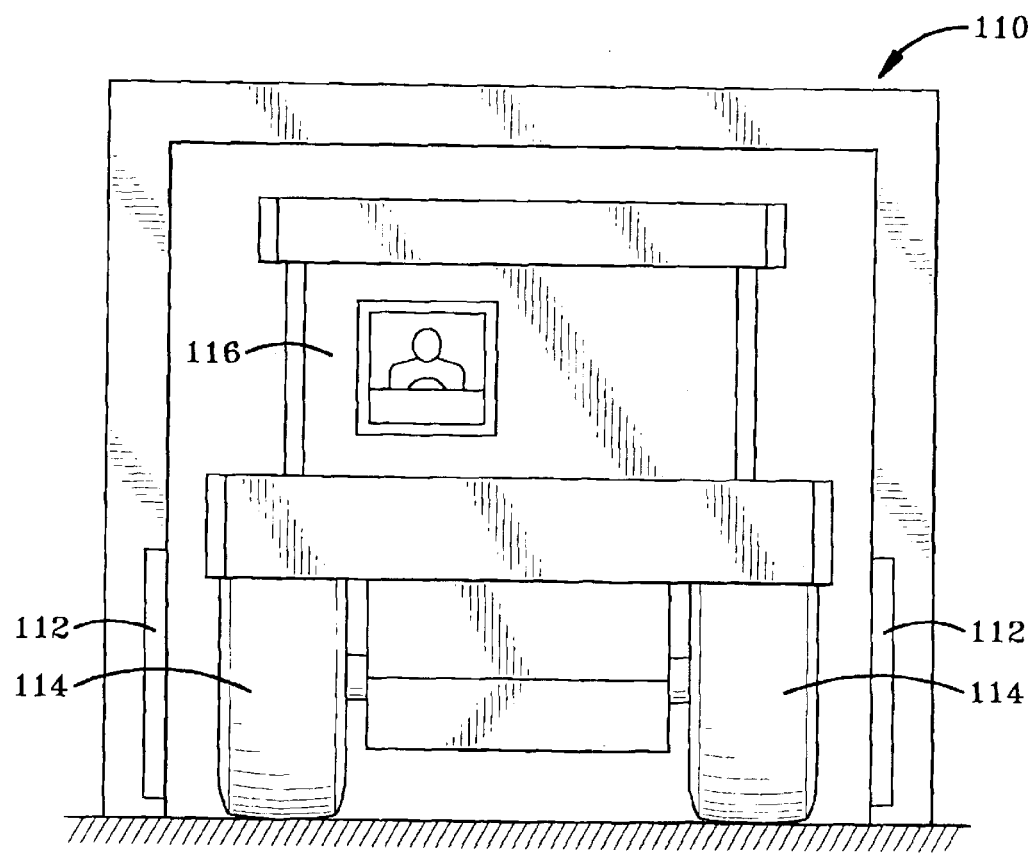
FIG. 2 is a front view of a gate-style reader with a vehicle passing through the reader.

A second embodiment of the invention is indicated generally by the numeral 110 in FIG. 2. In this embodiment, monitoring device 110 is in the form of a gate-style reader that has one or a pair of sensors 112 disposed at tire 114 level. When the vehicle 116 passes through monitoring device 110, tires 114 are passed adjacent sensors 112. If one of tires 114 is overheated, the molecules generated by overheated tire rubber will be sensed by one of sensors 112 and a warning signal is created. A gate-style reader may be positioned at strategic positions in at a work site where vehicles 116 are required to pass at a known frequency.

Figure 3:
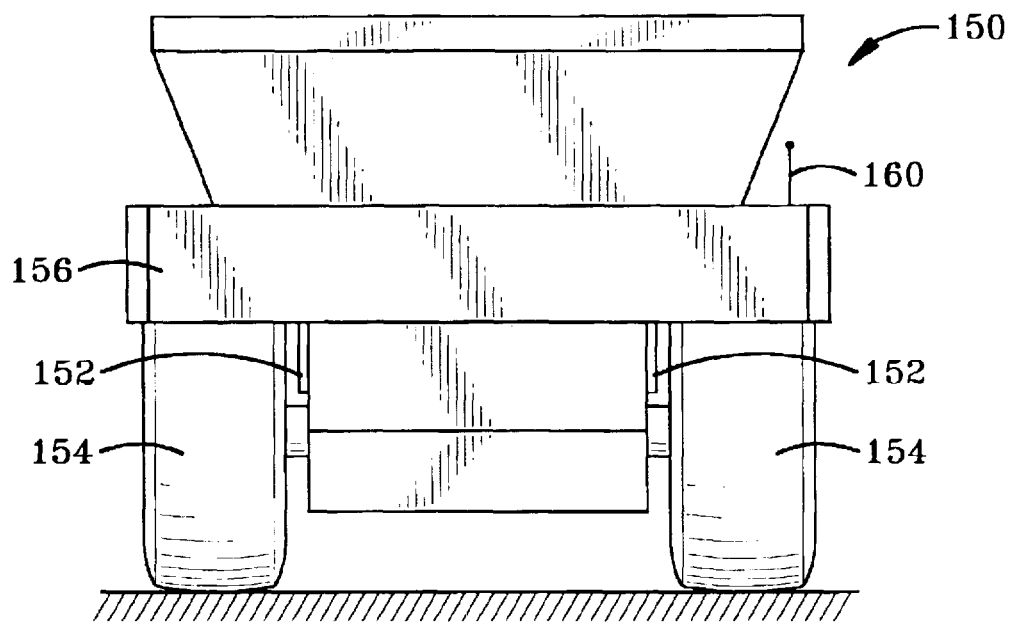
FIG. 3 is a front view of a vehicle having an on-board reader positioned adjacent each of the tires of the vehicle.

A third embodiment of the invention is indicated generally by the numeral 150 in FIG. 3. In this embodiment, monitoring device 152 is in the form of an onboard reader that is carried on vehicle 156 adjacent tire 154. Vehicle 156 may be an automated vehicle that is operated without a driver of a vehicle similar to vehicle 116 described above. In the embodiment of the invention depicted in FIG. 3, a monitoring device 152 is disposed adjacent each tire 154 of vehicle 156. In one embodiment, each tire 154 may have a monitoring device 152 on the inboard and outboard sides of the tire. In another embodiment, monitoring device 152 may be positioned directly above tire 154. If one of tires 154 is overheated, the molecules generated by overheated tire rubber will be sensed by one of the sensors on one of monitoring devices 152 and a warning signal is created.

Figure 4:
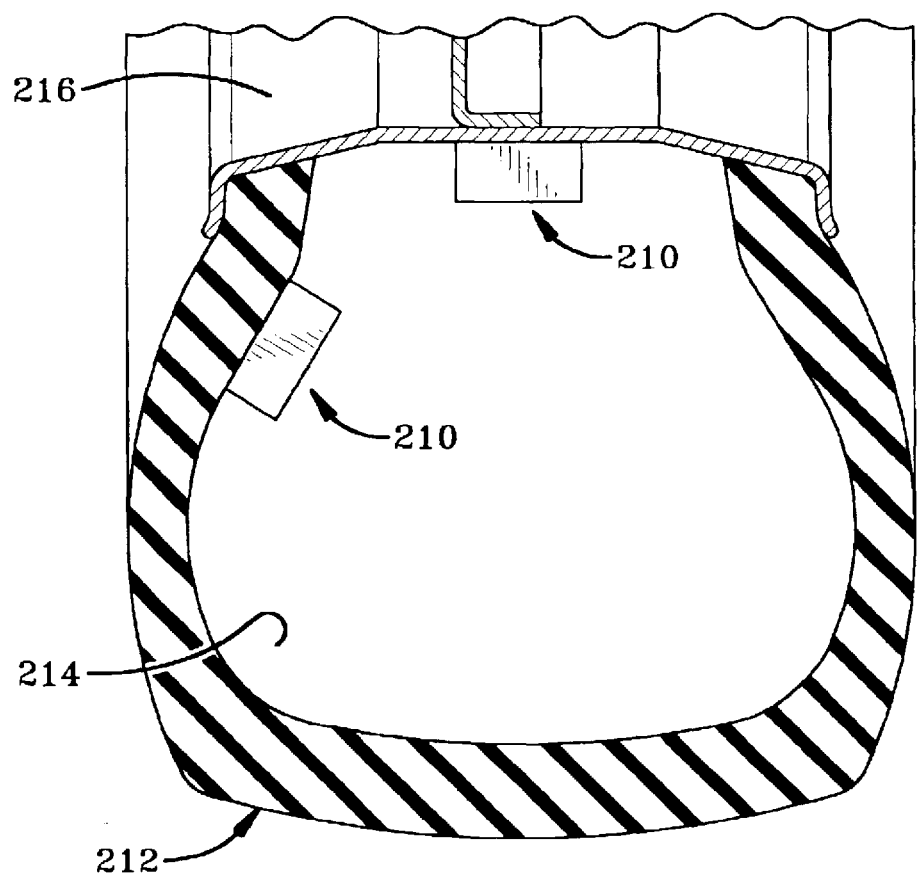
FIG. 4 is a section of another embodiment of the invention wherein the sensor is exposed to the air in the pressurized chamber of the tire.

A fourth embodiment of the invention is indicated generally by the numeral 210 in FIG. 4. In this embodiment, monitoring device 210 is positioned inside the tire 212 such that the chemical sensor is exposed to the gas disposed in the tire chamber 214. In one embodiment, monitoring device 210 is connected to the rim 216. In another embodiment, monitoring device 210 is connected to the tire sidewall.

In this embodiment, an overheated tire element will generate molecules that are dispersed into the air in chamber 214. The chemical sensor is configured to sense these molecules and creates a warning signal that is sent outside of tire 212 by appropriate transmission devices.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described. In all of the embodiments described above, a temperature sensor and pressure sensor may be used together or in combination with sensor 20, 112, 152, 210. Furthermore, various types of protective and/or supportive bodies may be used with the monitoring devices.

What is claimed is:

1. A monitoring device for detecting overheated pneumatic tires; the monitoring device comprising:
   a body capable of being positioned adjacent a pneumatic tire having that is at least partially fabricated from a tire material; and
   a sensor carried by the body; the sensor being configured to detect airborne molecules generated when the tire material of the pneumatic tire is overheated before the tire material combusts.

2. The monitoring device of claim 1, wherein the body defines an opening with the sensor being in fluid communication with the opening.

3. The monitoring device of claim 1, wherein the body has an outer surface and the sensor is disposed at the outer surface of the body.

4. The monitoring device of claim 1, wherein the sensor is carried by a body adapted to be hand-held and moved adjacent pneumatic tires by a user.

5. The monitoring device of claim 1, wherein the body carrying the sensor is adapted to be hand-held and moved adjacent pneumatic tires by a user.

6. The monitoring device of claim 1, wherein the body carrying the sensor is adapted to be an on-board reader.

7. The monitoring device of claim 1, wherein the pneumatic tire has an inner chamber; the sensor being exposed to the inner chamber of the pneumatic tire.

8. The monitoring device of claim 1, wherein the sensor is one of a LED-type, a catalytic-type, an electrochemical-type, and Metallic Oxide Semiconductor-type sensor.

9. In combination, a pneumatic tire having a chamber adapted to be pressurized and a monitoring device;
the pneumatic tire being fabricated from a tire material;
the monitoring device having a sensor exposed to the chamber of the pneumatic tire; and
the sensor being configured to detect airborne molecules generated when the tire material of the pneumatic tire is overheated.

10. The combination of claim 9, further comprising a rim; the pneumatic tire being mounted on the rim; the monitoring device being carried by the rim.

11. In combination, a vehicle and a monitoring device;
the vehicle having a plurality of pneumatic tires;
each of the pneumatic tires being fabricated from a tire material;
the monitoring device being carried by the vehicle adjacent at least one of the tires; and
the monitoring device having a sensor configured to detect airborne molecules generated when the tire material of the pneumatic tire is overheated before the tire material combusts.

12. The combination of claim 11, further comprising a monitoring device carried by the vehicle adjacent each of the tires.

13. In combination, a vehicle gate and a monitoring device;
the vehicle gate adapted to allow a target vehicle to drive through the gate; the target vehicle having a plurality of pneumatic tires;
each of the pneumatic tires being fabricated from a tire material;
the monitoring device having a sensor being carried by the vehicle gate at a sensor position; the sensor position adapted to cause at least a portion of the pneumatic tires of the target vehicle to pass adjacent the sensor when the target vehicle passes through the vehicle gate; and
the sensor configured to detect airborne molecules generated when the tire material of the pneumatic tire is overheated.

14. A method for detecting an overheated tire fabricated from a tire material; the method comprising the steps of:
providing a sensor configured to detect airborne molecules generated when the tire material of the pneumatic tire is overheated;
sensing the air adjacent the tire with the sensor;
sensing the concentration of airborne molecules generated when the tire material of the pneumatic tire is overheated; the airborne molecules being sensed being different than the molecules created during the combustion of tire material; and
creating an indication signal when the sensor detects a concentration of airborne molecules that meets a predetermined limit.

15. The monitoring device of claim 13, wherein the sensor is one of a LED-type, a catalytic-type, an electrochemical-type, and Metallic Oxide Semiconductor-type sensor.

16. The monitoring device of claim 13, wherein the target vehicle has a right side and a left side with tires disposed at bath sides of the vehicle; the vehicle gate having sensors carried by the vehicle gate sensor positions; the sensor positions adapted to cause at least the tires disposed at the right and left sides of the vehicle to pass adjacent the sensor when the target vehicle passes through the vehicle gate.

17. In combination, a vehicle gate and a monitoring device;
the vehicle gate adapted to allow a target vehicle to drive adjacent the gate; the target vehicle having a plurality of pneumatic tires;
each of the pneumatic tires being fabricated from tire material;
the monitoring device having a sensor carried by the vehicle gate at a sensor position; the sensor position adapted to cause at least a portion of the pneumatic tires of the target vehicle to pass adjacent the sensor when the target vehicle passes adjacent the vehicle gate; and
the sensor configured to detect airborne molecules generated when the tire material of the pneumatic tire is overheated.

18. The monitoring device of claim 17, wherein the sensor is one of a LED-type, a catalytic-type, an electrochemical-type, and Metallic Oxide Semiconductor-type sensor.

19. The monitoring device of claim 17, wherein the target vehicle has a right side and a left side with tires disposed at both sides of the vehicle; the vehicle gate having sensors carried by the vehicle gate sensor positions; the sensor positions adapted to cause at least the tires disposed at the right and left sides of the vehicle to pass adjacent the sensor when the target vehicle passes adjacent the vehicle gate.

* * * * *